(12) United States Patent
Auyeung

(10) Patent No.: US 8,249,150 B2
(45) Date of Patent: *Aug. 21, 2012

(54) SIMD-PROCESSOR-FRIENDLY MPEG-2 INTER-QUANTIZER

(75) Inventor: Cheung Auyeung, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 851 days.

This patent is subject to a terminal disclaimer.

(21) Appl. No.: 12/344,029

(22) Filed: Dec. 24, 2008

(65) Prior Publication Data

US 2010/0158106 A1 Jun. 24, 2010

(51) Int. Cl.
*H04N 7/12* (2006.01)
(52) U.S. Cl. ................................. 375/240.03
(58) Field of Classification Search ............. 375/240.03
See application file for complete search history.

(56) References Cited

U.S. PATENT DOCUMENTS

| 5,355,167 A * | 10/1994 | Juri | 375/240.03 |
| 6,738,522 B1 * | 5/2004 | Hsu et al. | 382/234 |
| 7,286,714 B2 | 10/2007 | Bard et al. | |
| 2007/0110327 A1 * | 5/2007 | Han | 382/251 |

FOREIGN PATENT DOCUMENTS

JP 2007-124409 A2 5/2007

* cited by examiner

*Primary Examiner* — Jay Patel
*Assistant Examiner* — Richard Torrente
(74) *Attorney, Agent, or Firm* — John P. O'Banion

(57) ABSTRACT

A method and apparatus for performing quantization during video compression, such as within an MPEG-2 encoder. Inter-quantization is particularly described, although the teachings may be applied to intra-quantization as well. Computationally intensive portions of the quantization process are split into multiple components in response to differing execution probability. A first component is executed within each quantization iteration, and preferably is performed in parallel, such as using SIMD processing. At least one additional component, such as a second component, is serially processed in response to detecting a condition that does not arise with each loop iteration. One configuration replaces division operations with a combination of multiply and shift operations, while making extended use of table lookup procedures to reduce processing overhead.

24 Claims, 5 Drawing Sheets

```
for(iColLoop = 0; iColLoop < 8; iColLoop++ )
{
    tmp = coeff[iColLoop];
    sign = MP2_SIGN(tmp);
    abs = sftcdc_abs(tmp);

tmp = sign * (((abs<<8)/(qmatrix[iColLoop]*iQScale)) >> 4);

if( tmp != 0 ){
        qcoeff[iColLoop] = tmp;
        iqcoeff[iColLoop] = ( ( 2 * qcoeff[iColLoop] + sign ) * iQScale* qmatrix[iColLoop] ) / 32;
        SATURATION( iqcoeff[iColLoop] );
        sum += iqcoeff[iColLoop];
        iSol |= pFlag[iColLoop];
    }
}
```

52 — tmp = sign * ((((abs<<8)/(qmatrix[iColLoop]*iQScale)) >> 4);

is equivalent to:

54 —
```
q = qmatrix[iColLoop]*iQScale;
abs = abs<<4;
```

56 —
```
if((abs>=q) {
    tmp = sign * ((((abs<<4)/q) >> 4);
} else tmp=0
```

FIG. 3

```
nonZero = 0;
for(iColLoop = 0; iColLoop < 8; iColLoop++ ) {
    qcoeff [iColLoop] = 0;
    iqcoeff [iColLoop] = 0
    tmp = coeff [iColLoop];
    abs [iColLoop] = sftcdc_abs(tmp)<<4;
    q [iColLoop] = qmatrix [iColLoop]*iQScale);
    if (abs [iColLoop] >= q [iColLoop]) nonZero |= 1;
    nonZero = nonZero<<1;
}                                                           ~72 if (nonZero) {
    for(iColLoop = 0; iColLoop < 8; iColLoop++ ) {
        if (nonZero & 0x80) {
            sign = MP2_SIGN( coeff[iColLoop] );
            tmp = (((abs [iColLoop]<<4) / q[iColLoop]) >> 4);      ~78
            qcoeff [iColLoop] = sign*tmp;
            iqcoeff [iColLoop] = ( ( 2 * qcoeff[iColLoop] + sign ) * q[iColLoop] ) / 32;
            SATURATION( iqcoeff [iColLoop] );
            sum += iqcoeff [iColLoop];
        }                                                   ~76
    }
    nonZero = nonZero << 1;
}                                                           ~80
}
```
74 { ... }

SIMD-PROCESSOR-FRIENDLY MPEG-2 INTER-QUANTIZER

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to video encoding methods, and more particularly to MPEG-2 encoder inter-quantization methods.

2. Description of Related Art

MPEG-2 is a multi-part video compression standard which has been adopted world-wide as a core technology for use in digital media distribution and playback in a variety of applications, which include digital television, computer, communications and consumer industries. MPEG-2 is an extension of the MPEG-1 international standard for digital compression of audio and video signals. MPEG-2 is directed at broadcast formats at higher data rates and provides extra algorithmic 'tools' for efficiently coding interlaced video, while supporting a wide range of bit rates and providing multichannel surround sound coding.

Recent progress in digital technology has made the widespread use of compressed digital video signals practical. The use of standardized compression allows new services to interoperate with each other and encourages necessary investments toward producing inexpensive integrated circuits and equipment.

MPEG-2 is a video coding standard supporting a diverse range of applications, and utilizing different algorithmic 'tools', by way of profiles and levels, which are implemented for each of a number of applications as defined within the full standard.

The color signals utilized by MPEG-2 compression are expressed as luminance (Y) and chrominance (U and V) components. The chrominance bandwidth may be reduced relative to the luminance without significantly affecting the picture quality. The terms 4:2:2 and 4:2:0 are often used to describe the sampling structure of the digital picture, with 4:2:2 indicating the chrominance is horizontally subsampled by a factor of two relative to the luminance, while 4:2:0 means the chrominance is horizontally and vertically subsampled by a factor of two relative to the luminance. Although other arrangements may be alternatively utilized.

MPEG-2 is capable of significantly compressing the bit rate of standard-definition 4:2:0 video, such as down to about 3-15 Mbit/s, although at lower bit rates quality suffers and artifacts are introduced. Compression is performed in response to removing redundant information from the signal at the coder prior to transmission and then re-inserting this information at the decoder. A coder and decoder pair are referred to as a 'codec'.

Two types of redundancy are addressed by compression in modern video codecs, they are (1) spatial and (2) temporal. In each form of encoding correlations within the video are made use of to reduce bit rates of the resultant video. In reducing spatial redundancy, the relationships between neighboring pixels in the same vicinity of a frame are utilized to minimize the encoding rate and thus provide spatial compression. In reducing temporal redundancy, the temporal (time-related) relationships between pixels in nearby frames (temporally displaced images) are utilized to minimize encoding rate and thus provide temporal compression.

Two key techniques employed in an MPEG codec are intra-frame (within the frame) Discrete Cosine Transform (DCT) coding and motion-compensated inter-frame (between frames) prediction. It will be noted that "intra" is the prefix from Latin meaning "within", while "inter" is a prefix from Latin which means "between", or "amidst".

During DCT coding a two-dimensional DCT is performed on small blocks (e.g., 8×8 pixels) of each component of the picture to produce blocks of DCT coefficients. The magnitude of each DCT coefficient indicates the contribution of a particular combination of horizontal and vertical spatial frequencies to the original picture block. The coefficient corresponding to zero horizontal and vertical frequency is called the DC coefficient.

Quantization is adjusted to reduce numerical precision while maintaining a desired level of perceived quality in the DCT blocks transmitted to the decoder, wherein the inverse transform is performed to reconstruct each image in the sequence of images. The degree of quantization applied to each coefficient is weighted according to the visibility of the resulting quantization noise to a human observer. It should be noted that in practice, this results in high-frequency coefficients being more coarsely quantized than low-frequency coefficients.

Coding is the process of serialization and encoding of the quantized DCT coefficients to exploit the likely clustering of energy into the low-frequency coefficients and the frequent occurrence of zero-value coefficients. For example, the block may be scanned in a diagonal zig-zag pattern starting at the DC coefficient to produce a list of quantized coefficient values, ordered according to the scan pattern.

One of the continuing drawbacks of MPEG-2 coding and decoding is that it remains computationally intensive, with quantization regarded as the most computationally expensive function within an encoder. High complexity computations require high-bandwidth processors to perform the coding and encoding in real-time, or extended processing times for off-line (non-real-time processing) operations.

Accordingly, a need exists for methods of reducing computational complexity when encoding video, such as according to the MPEG-2 standard. The present invention fulfills that need, and others, without diminishing the quality of encoder output.

BRIEF SUMMARY OF THE INVENTION

This invention reduces the computation overhead associated with video encoding. The present invention is particularly well-suited for use with MPEG-2 inter-quantization, however, it will be appreciated that it may be adapted for use with intra-quantization, and with other than MPEG-2 encoding methods. In the present invention the inter-quantization is sped up by splitting up the quantization computation into multiple components, each subject to different temporal execution probabilities and thus the components are no longer performed with the same frequency, thereby reducing overall processing overhead. In addition, by splitting up the computations in this manner portions of the computation can be tailored for execution on Single Instruction stream Multiple Data stream (SIMD) processors.

By way of example, and not limitation, the multiple components will be described as a first component and a second component, although the operations may be split into additional components, as desired, following the teachings of the present invention and thus without departing from the present invention. The first component is compatible with SIMD processing performed with each iteration, while the second component is serially performed and computed less frequently, or only occasionally. SIMD processing performs one operation at a time, from a sequence of operations, on multiple sets of data. SIMD is typically used to add or multiply eight or more sets of numbers at the same time for use in multimedia encoding and rendering, as well as in scientific applications. By way of example, hardware registers are loaded with numbers, and the mathematical operation is performed on all registers simultaneously.

Accordingly, the present invention enhances the speed of the quantizer by: (1) replacing division operations within the quantizer by multiplication operations in combination with shifts moving it to the lower probability block, and (2) increasing the number of operations that can be executed in parallel by Streaming-SIMD_Extensions, such as SSE2 instructions. It will be appreciated that Streaming SIMD Extensions provide a series of additional instructions built into processor chips for improved multimedia performance in response to performing mathematical operations on multiple sets of data at the same time.

The invention is amenable to being embodied in a number of ways, including but not limited to the following descriptions.

One embodiment of the invention is a method of performing quantization for compression encoding, comprising: (a) splitting quantization operations into multiple components having different execution probabilities; (b) executing a first quantization component in parallel for a number of pixels for each quantization loop; and (c) executing a second quantization component at a lower frequency within the quantization loop in response to meeting a given quantization condition. In a typical application of the method, one row of quantization coefficients are computed within each quantization loop. In one implementation of the invention, the first quantization component is executed once for each loop of quantization, such as computing sign and absolute value, as well as performing at least a portion of the quantization. It will be appreciated that the quantization may itself be split across the multiple components. The method is particularly well suited for executing the first quantization component in parallel on a processor configured for Single-Instruction-Multiple-Data (SIMD) processing. In one mode of the invention the second quantization component performs inverse quantization, which can include performing thresholding and rounding. In one simple implementation, the second quantization component is computed only for non-zero quantized components. In order to simplify operations, the division computations required during quantization are replaced by combining multiplication and shift operations. In addition, lookup tables are preferably utilized to further speed computations.

One embodiment of the invention is a method of performing MPEG-2 inter-quantization for compression encoding, comprising: (a) splitting MPEG-2 quantization operations into a multiple components having different execution probabilities; wherein at least one quantization component, a first MPEG-2 quantization component, is executed once for each loop of quantization; (b) executing the first MPEG-2 quantization component in parallel for a number of pixels for each MPEG-2 quantization loop to compute sign, absolute value and at least a portion of the MPEG-2 quantization; wherein said first MPEG-2 quantization component is configured for execution in parallel by at least one processor configured for Single-Instruction-Multiple-Data (SIMD) processing; and (c) executing a second MPEG-2 quantization component at a lower probability within the MPEG-2 quantization loop in response to meeting a given quantization condition. In one mode of the invention the first MPEG-2 quantization component performs all or a portion of the MPEG-2 quantization operations. It will be appreciated that the MPEG-2 quantization can be split across multiple components, such as the first and second MPEG-2 component, according to one implementation of the invention. Although the second MPEG-2 quantization component preferably performs inverse MPEG-2 quantization, it may also perform a portion of the MPEG-2 quantization operations. In one mode of the invention, the second MPEG-2 quantization component further performs thresholding and rounding. In a simple embodiment, the second MPEG-2 quantization component is computed only for non-zero quantized components.

One embodiment of the invention is an apparatus for performing quantization within video compression encoding, comprising: (a) a computer configured for video encoding; and (b) programming executable on said computer for, (b)(i) splitting quantization operations into multiple components having different execution probabilities, (b)(ii) executing a first quantization component in parallel for a number of pixels for each quantization loop, and (b)(iii) executing a second quantization component at a lower frequency within the quantization loop in response to meeting a given quantization condition.

The present invention provides a number of beneficial aspects which can be implemented either separately or in any desired combination without departing from the present teachings.

An aspect of the invention is to provide an SIMD processor friendly quantization for video compression encoding.

Another aspect of the invention is to provide an SIMD processor friendly inter-quantization for MPEG-2 video compression encoding.

Another aspect of the invention is to provide low overhead compression encoding for MPEG-2 video.

Another aspect of the invention is toward improving DCT coding of pixel blocks.

Another aspect of the invention is a video compression method providing reducing computational overhead of the quantization operation.

Another aspect of the invention is a video compression method which splits the quantization across multiple processing sections, based on execution probability within the loop, wherein certain operations are not performed on each loop.

Another aspect of the invention is a video compression method which splits quantization across multiple processing sections, one or more of which are beneficially executed on a processor configured for SIMD execution.

A still further aspect of the invention is to speed quantization during video encoding.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 2 is a code section exemplifying inter-quantization according to an aspect of the present invention.

FIG. 3 is a code section exemplifying splitting of the inter-quantization according to an aspect of the present invention.

FIG. 4 is a code section exemplifying operation of a fast inter-quantizer according to an aspect of the present invention.

DETAILED DESCRIPTION OF THE INVENTION

Referring more specifically to the drawings, for illustrative purposes the present invention is embodied in the apparatus generally shown in FIG. 1 through FIG. 5. It will be appreciated that the apparatus may vary as to configuration and as to details of the parts, and that the method may vary as to the specific steps and sequence, without departing from the basic concepts as disclosed herein.

The present invention provides beneficially reduced processing overhead by splitting the computation-intensive portion of the quantizer into two components having different probabilities of execution. The first component is always performed and it is executed in parallel to reduce the CPU time, for example by SIMD instructions. The second component has a lower probability of execution (lower frequency) and is a portion which contains a division during quantization. Since the second component is executed only occasionally, the average computational overhead of the second component is reduced. For simplicity, the second component is implemented in serial. To further reduce computation, the divide in the quantizer is replaced by multiply and shift in the second component using lookup tables.

Figure 1:
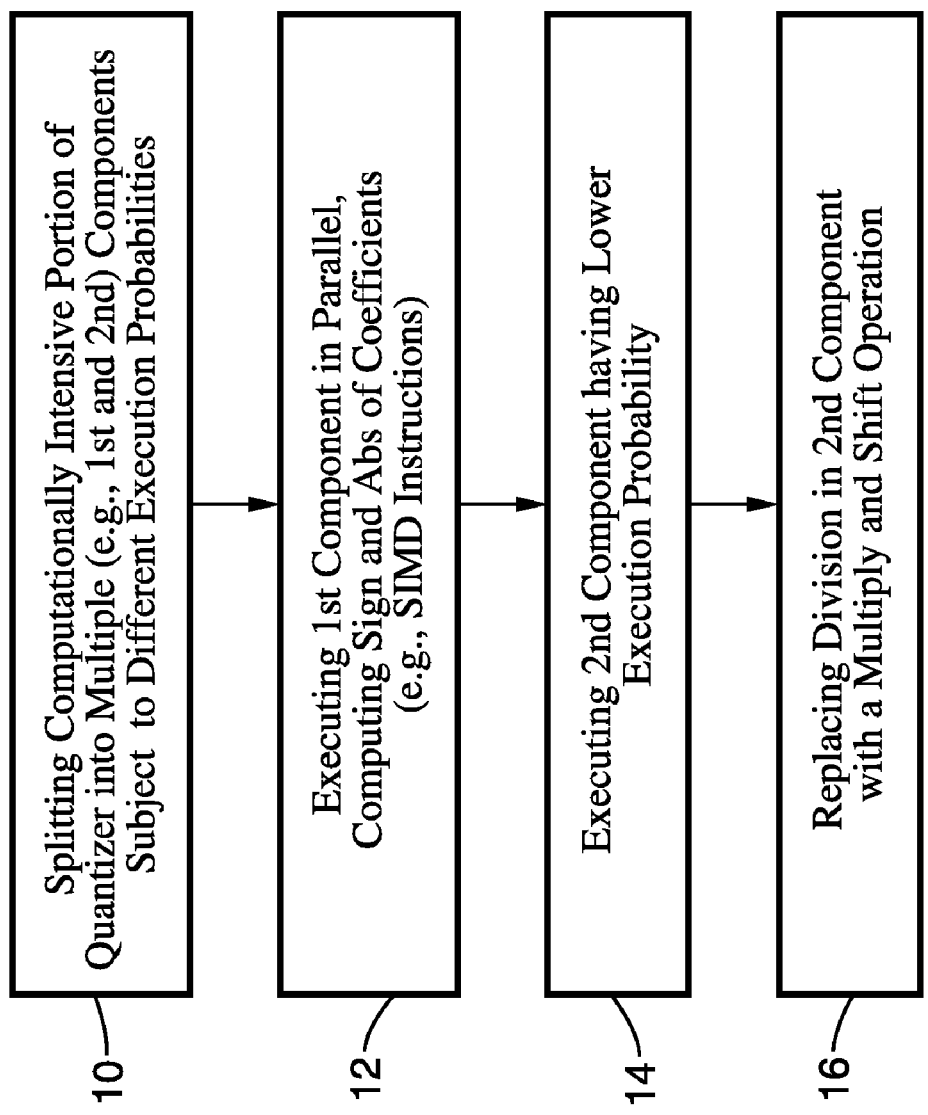
FIG. 1 is a flowchart of general quantization execution according to an embodiment of the present invention.

FIG. 1 illustrates the general flow of operation according to the present invention. Represented in block 10, the computationally intensive portion of the quantizer is split into multiple component parts on the basis of execution probabilities. Said another way, portions are separated which are subject to less frequency of execution. In the present example embodiment, two parts are described, one (first component) which is executed for each loop and another (second component) which is executed at a lower frequency. In block 12 the first component is executed in parallel, such as computing the sign and abs coefficients. It is preferred that these operations are performed using SIMD instructions. Executed according to a subset of the loop 14 is the second component, such as for non-zero quantized coefficients. The second component is shown preferably executing a division operation using a multiply and shift operation as per block 16.

FIG. 2 illustrates example code 30 for executing MPEG-2 inter-quantization according to the invention. Looping constraints are shown 32, with sign and abs of the coefficients determined in parallel, preferably by SIMD processing. One row of DCT coefficients are computed within loop 32. It will be noted that 64 DCT coefficients are computed for an 8×8 pixel block. In block 34 the sign and absolute values are determined. Computation is broken up into an SIMD compatible first component 34, and at least one component (second component) that is executed less frequently, as following. Statement 36 is an MPEG-2 quantization matrix with iQScale as the Q step size. Detection of the lower probability condition arises at statement 38 which directs execution of the lower probability computational component 40. In the present case, the lower probability component is only executed for non-zero quantized coefficients. In block 40 the quantization coefficient is set and then inverse quantization performed. The SATURATION steps provides thresholding with rounding being performed for MPEG-2 in the following steps.

FIG. 3 illustrates an example embodiment of how to provide additional benefits by splitting the inter-quantization step 50, which was described as block 36 in FIG. 2, according to aspects of the invention. In statement 52 an example of the main quantization operation is depicted, which is equivalent to, and can be divided into, statements 54 and 56. First component 54 is configured for being executed with each loop and preferably in parallel, (e.g., SIMD). It will be noted that q can be precomputed because it does not change in the lookup table. The second component 56 is configured for being executed with less frequency than the loop, and is referred to as a lower probability execution block. The computation in block 56 is only performed in response to meeting a threshold condition, otherwise tmp is set to zero. It should be appreciated that some processor architectures allow a parallel comparison to be performed.

The following describes replacing division operations by multiplications and shifts according to the invention. For all possible value of q in MPEG-2, the quantization operation given by:

$tmp=(((abs<<4)/q)>>4)$ is equivalent to the operation given by:

$tmp=(abs*man[q])>>expo[q]$

It should be appreciated in an embodiment for the above abs is 12 bits, with man[q] having a maximum length of 16 bits and expo[q] is less than or equal to 24. Wherein the computations remain compatible with 32 bits×32 bits in the 32 bit arithmetic.

To save storage space, the man and expo for, $q=q\text{matrix}*i Q\text{Scale}$ are preferably obtained by using two unsigned integer 32 bit lookup tables, or more preferably can be combined into a table based scalar operation.

```
uint32 tinter_qmatrix_qscale[255][42];
uint32 tqscale_to_qscale_idx[113];
``` where:

```
iQScaleIdx = qscale_to_scale_idx[iQScale];
tmp = inter_qmatrix_qscale[qmatrix][iQScaleIdx];
expo[q] = tmp>>24;
man[q] = tmp & 0xFFF;
```

By way of example, and not limitation, the lookup tables may be of a form as follows. As seen above these tables define qscale-to-qscale (e.g., 113 entries) as well as qmatrix-to-qscale for hex 001h, out of 0FFh sections (e.g., showing only a first of 255 sections having 42 entries each).

```
const uint32_t qscale_to_qscale_idx[113]=
{
   99,  0,  1,  2,  3,  4,  5,  6,  7, 99, //    0 . . . 9
    8, 99,  9, 99, 10, 99, 11, 99, 12, 99, //   10 . . . 19
   13, 99, 14, 99, 15, 99, 16, 99, 17, 99, //   20 . . . 29
   18, 99, 19, 99, 20, 99, 21, 99, 22, 99, //   30 . . . 39
   23, 99, 24, 99, 25, 99, 26, 99, 27, 99, //   40 . . . 49
   28, 99, 29, 99, 30, 99, 31, 99, 32, 99, //   50 . . . 59
   33, 99, 34, 99, 35, 99, 99, 99, 99, 99, //   60 . . . 69
   99, 99, 36, 99, 99, 99, 99, 99, 99, 99, //   70 . . . 79
   37, 99, 99, 99, 99, 99, 99, 99, 38, 99, //   80 . . . 89
   99, 99, 99, 99, 99, 99, 39, 99, 99, 99, //   90 . . . 99
   99, 99, 99, 99, 40, 99, 99, 99, 99, 99, //  100 . . . 109
   99, 99, 41,
};
    const uint32_t inter_qmatrix_qscale [255] [42]={
    {// 1
0x00000010u, 0x00000008u, 0x0b002aabu, 0x00000004u, 0x0d006667u,
0x0c002aabu, 0x0d004925u,
0x00000002u, 0x0b000ccdu, 0x0b000aabu, 0x0e004925u, 0x00000001u,
0x0c000e39u, 0x0c000ccdu,
0x0c000ba3u, 0x0c000aabu, 0x0e002763u, 0x0e002493u, 0x0f004445u,
0x01000001u, 0x0f003c3du,
0x0d000e39u, 0x10006bcbu, 0x0d000ccdu, 0x10006187u, 0x0d000ba3u,
0x0e001643u, 0x0b0002abu,
0x0e00147bu, 0x0f002763u, 0x10004bdbu, 0x0d000925u, 0x0b000235u,
0x0f002223u, 0x10004211u,
0x02000001u, 0x0e000e39u, 0x0d000667u, 0x0e000ba3u, 0x0c0002abu,
0x0e0009d9u, 0x0e000925u,        },
```

FIG. 4 illustrates example code 70 for a fast inter-quantizer according to the present invention. In block 72 all eight pixels are processed in parallel, preferably utilizing SIMD processing. If all the coefficients are zero then nothing needs to be performed. It will be appreciated that the $5^{th}$ line in block 72 (abs[iColLoop]) gets the absolute value multiplied by 16. In the $6^{th}$ line (q[iColLoop]) the threshold can be precomputed at the picture boundary. It should be noted that in MPEG-2 only 32 distinct step sizes are defined.

The lower probability second component is determined in section 74 in which another execution loop is established. Within secondary quantization of execution block 76, the divide operation is replaced by multiplications and shifts of interior block 78 to further reduce overhead, and the constraint is shifted 80 at the end of each pass. Inverse quantization is seen in the steps following block 78, prior to the SATURATION thresholding.

Figure 5:
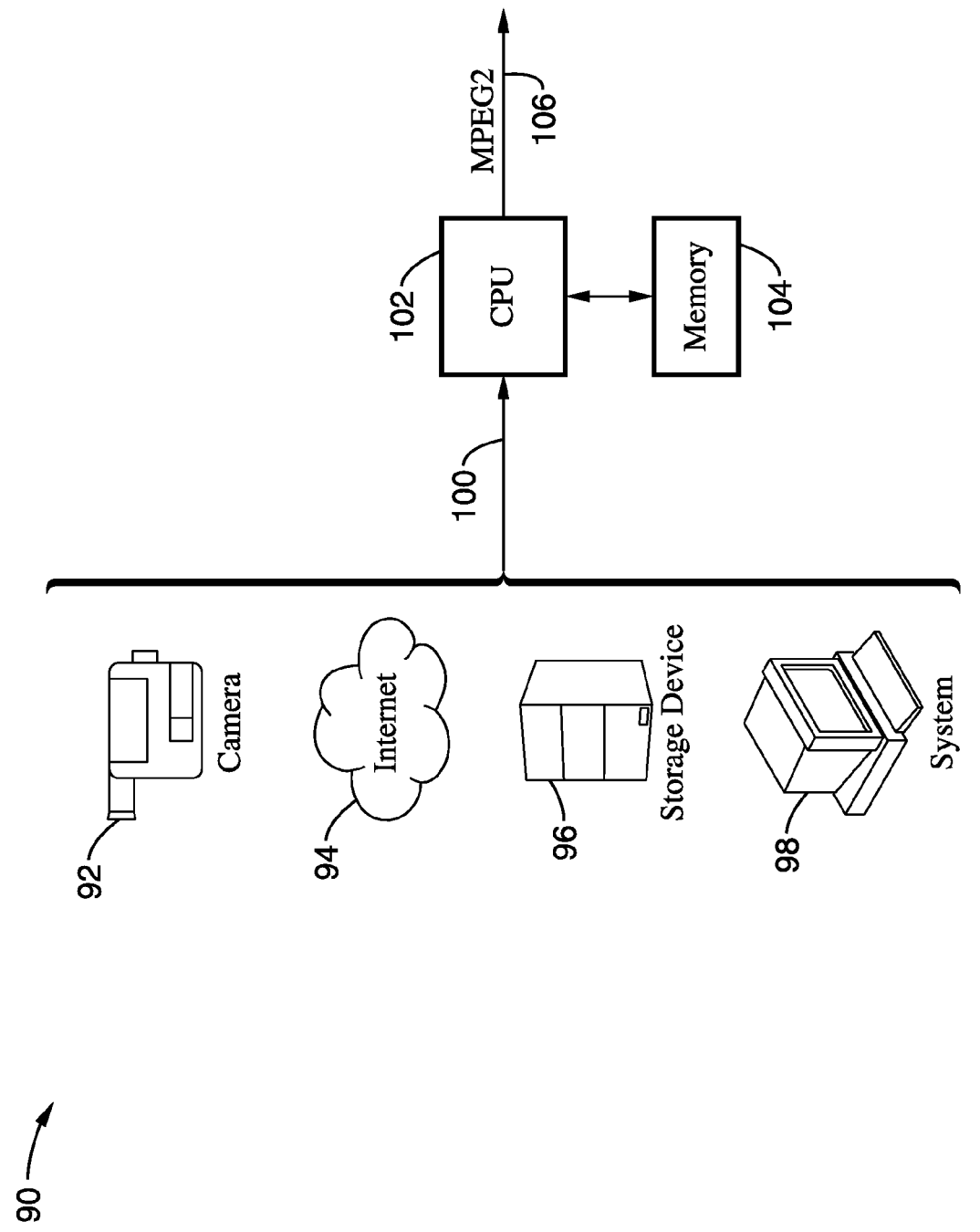
FIG. 5 is a block diagram of an encoder configured with computer and memory according to an aspect of the present invention.

FIG. 5 illustrates an encoder 90 which receives video data 100 from any desired input, such as camera 92, Internet 94, storage 96, systems 98, and other means and combinations thereof. One or more computers 102 are adapted to execute programming from memory 104 according to the present invention. Preferably, the computer(s) are adapted to perform SIMD processing. An encoded MPEG-2 signal 106 is then output for present or future decoding to decompress the video prior to or at the point of playback.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of performing inter-quantization for compression encoding, comprising:
   splitting quantization operations into multiple components having different execution probabilities;
   executing elements of a first quantization component in parallel for a number of pixels within each quantization loop;
   wherein said first quantization component computes sign, absolute value and performs at least a portion of the quantization; and
   executing elements of a second quantization component at a lower frequency within said quantization loop in response to meeting a given quantization condition;
   wherein division computations required during quantization are performed within said second quantization component in response to combining multiplication and shift operations.

2. A method as recited in claim 1, wherein one row of quantization coefficients are computed within each said quantization loop.

3. A method as recited in claim 1, wherein said first quantization component is executed once for each loop of quantization.

4. A method as recited in claim 1, wherein said inter-quantization is performed in response to a computation having the form:

$$tmp=sign*(((abs<<8)/(qmatrix[iColLoop]*iQScale))>>4),$$

performed for iterations of i column loop (iColLoop)) wherein tmp is the coefficient for i column loop (iColLoop), used in determining sign and absolute value abs=sftcdc_abs (tmp), with sign and abs performed in parallel, and in which qmatrix is the quantization matrix and iQScale is the Q step size.

5. A method as recited in claim 4, wherein said inter-quantization is split into two sets of operations, comprising:
   a first set of operations of a form: q=qmatrix[iColLoop] *iQScale, and abs=abs<<4, performed on each loop; and a second set of operations of a form:

if $(abs \geq q)\{tmp=sign*(((abs<<4)/q)>>4)\}$; else
$tmp=0$, in which sign and abs of quantization matrix are obtained in parallel, with q as quantization matrix (qmatrix) for i column loop (iColLoop)) multiplied by iQScale as the Q step size and in which tmp is the coefficient for the iColLoop.

6. A method as recited in claim 1:
wherein the elements of said first quantization component is configured for execution in parallel by a processor configured for Single-Instruction-Multiple-Data (SIMD) processing; and
wherein the elements of said second quantization component is configured for execution in series.

7. A method as recited in claim 1, wherein second quantization component performs inverse quantization.

8. A method as recited in claim 7, wherein second quantization component further performs thresholding and rounding.

9. A method as recited in claim 1, wherein second quantization component is computed only for non-zero quantized components.

10. A method of MPEG-2 inter-quantization compression encoding, comprising:
splitting MPEG-2 inter-quantization operations into multiple components having different execution probabilities within a quantization loop;
wherein elements of at least one MPEG-2 quantization component, a first MPEG-2 quantization component, is executed once for each loop of quantization;
executing the elements of said first MPEG-2 quantization component in parallel for a number of pixels for each MPEG-2 quantization loop to compute sign, absolute value and at least a portion of the MPEG-2 quantization;
wherein said first MPEG-2 quantization component is configured for execution in parallel by at least one processor configured for Single-Instruction-Multiple-Data (SIMD) processing; and
executing elements of a second MPEG-2 quantization component in series at a lower probability within said quantization loop in response to meeting a given quantization condition;
wherein division computations required during quantization are performed within said second MPEG-2 quantization component in response to combining multiplication and shift operations.

11. A method as recited in claim 10, wherein said MPEG-2 inter-quantization is performed in response to a computation having the form:

$tmp=sign*(((abs<<8)/(qmatrix[iColLoop]*iQScale))>>4)$;

performed for iterations of i column loop (iColLoop)) wherein tmp is the coefficient for the iColLoop, used in determining sign and absolute value abs=sftcdc_abs (tmp), with sign and abs performed in parallel, and in which qmatrix is the quantization matrix and iQScale is the Q step size.

12. A method as recited in claim 11, wherein said MPEG-2 inter-quantization is split into two sets of operations, comprising:
a first set of operations of a form: q=qmatrix[iColLoop] *iQScale; and abs=abs<<4, performed on each loop; and
a second set of operations of a form:

if $(abs \geq q)\{tmp=sign*(((abs<<4)/q)>>4)\}$; else
$tmp=0$, in which sign and abs of quantization matrix are obtained in parallel, with q as quantization matrix (qmatrix) for i column loop (iColLoop)) multiplied by iQScale as the Q step size and in which tmp is the coefficient for the iColLoop.

13. A method as recited in claim 10, wherein said first MPEG-2 quantization component performs all or a portion of the MPEG-2 quantization operations.

14. A method as recited in claim 10, wherein said second MPEG-2 quantization component further performs thresholding and rounding.

15. A method as recited in claim 10, wherein said second MPEG-2 quantization component performs inverse-quantization.

16. A method as recited in claim 10, wherein second MPEG-2 quantization component is computed only for non-zero quantized components.

17. An apparatus for performing inter-quantization within video compression encoding, comprising:
a computer configured for video encoding; and
programming executable on said computer for:
splitting quantization operations into multiple components having different execution probabilities;
executing elements within a first quantization component in parallel for a number of pixels for each quantization loop;
wherein said first quantization component computes sign, absolute value and performs at least a portion of the quantization; and
executing elements within a second quantization component at a lower frequency within said quantization loop in response to meeting a given quantization condition;
wherein division computations required during quantization are performed within said second quantization component in response to combining multiplication and shift operations.

18. An apparatus as recited in claim 17, wherein said programming executable on said computer is configured for computing one row of quantization coefficients within each said quantization loop.

19. An apparatus as recited in claim 17:
wherein the elements of said first quantization component is configured for execution in parallel by a processor configured for Single-Instruction-Multiple-Data (SIMD) processing; and
wherein the elements of said second quantization component are configured for execution in series.

20. An apparatus as recited in claim 17, wherein said programming executable on said computer performs inverse quantization, and/or thresholding and rounding in said second quantization component.

21. A method of performing inter-quantization for compression encoding, comprising:
splitting quantization operations into multiple components having different execution probabilities;
executing elements of a first quantization component for a number of pixels within each quantization loop;
wherein said first quantization component computes sign, absolute value and performs at least a portion of the quantization; and
executing elements of a second quantization component at a lower frequency within said quantization loop in response to meeting a given quantization condition;

wherein said quantization comprises inter-quantization performed in response to a computation having the form:

$$tmp = \text{sign} * (((abs<<8) / (q\text{matrix}[iColLoop] * iQScale)) >> 4);$$

performed for iterations of i column loop (iColLoop) wherein tmp is the coefficient for i column loop (iColLoop), used in determining sign and absolute value abs=sftcdc_abs (tmp), with sign and abs performed in parallel, and in which qmatrix is the quantization matrix and iQScale is the Q step size.

22. A method as recited in claim 21, wherein said inter-quantization is split into two sets of operations, comprising:
   a first set of operations of a form: q=qmatrix[iColLoop]*iQScale, and abs=abs<<4, performed on each loop; and
   a second set of operations of a form:

$$\text{if } (abs \geq q) \{tmp = \text{sign} * (((abs<<4)/q) >> 4)\}; \text{ else } tmp=0;$$

in which sign and abs of quantization matrix are obtained in parallel, with q as quantization matrix (qmatrix) for i column loop (iColLoop)) multiplied by iQScale as the Q step size and in which tmp is the coefficient for the iColLoop.

23. A method of MPEG-2 inter-quantization compression encoding, comprising:
   splitting MPEG-2 inter-quantization operations into multiple components having different execution probabilities;
   wherein elements of at least one MPEG-2 quantization component, a first MPEG-2 quantization component, is executed once for each loop of quantization;
   executing the elements of said first MPEG-2 quantization component in parallel for a number of pixels for each MPEG-2 quantization loop to compute sign, absolute value and at least a portion of the MPEG-2 quantization;
   wherein said first MPEG-2 quantization component is configured for execution in parallel by at least one processor configured for Single-Instruction-Multiple-Data (SIMD) processing; and
   executing elements of a second MPEG-2 quantization component in series at a lower probability within said quantization loop in response to meeting a given quantization condition;
   wherein said MPEG-2 quantization comprises inter-quantization performed in response to a computation having the form:

$$tmp = \text{sign} * (((abs<<8) / (q\text{matrix}[iColLoop] * iQScale)) >> 4);$$

performed for iterations of i column loop (iColLoop) wherein tmp is the coefficient for the iColLoop, used in determining sign and absolute value abs=sftcdc_abs (tmp), with sign and abs performed in parallel, and in which qmatrix is the quantization matrix and iQScale is the Q step size.

24. A method as recited in claim 23, wherein said MPEG-2 inter-quantization is split into two sets of operations, comprising:
   a first set of operations of a form: q=qmatrix[iColLoop]*iQScale; and abs=abs<<4, performed on each loop; and
   a second set of operations of a form:

$$\text{if } (abs \geq q) \{tmp = \text{sign} * (((abs<<4)/q) >> 4)\}; \text{ else } tmp=0,$$

in which sign and abs of quantization matrix are obtained in parallel, with q as quantization matrix (qmatrix) for i column loop (iColLoop) multiplied by iQScale as the Q step size and in which tmp is the coefficient for the iColLoop.

* * * * *